Nov. 15, 1927.

L. B. HUNTER 1,649,307

METHOD OF MAKING CHOCOLATE PRODUCTS

Filed July 16, 1923    5 Sheets-Sheet 3

INVENTOR.
Lewis B. Hunter
BY
James L. Stewart
ATTORNEYS.

Nov. 15, 1927.

L. B. HUNTER 1,649,307

METHOD OF MAKING CHOCOLATE PRODUCTS

Filed July 16, 1923    5 Sheets-Sheet 4

INVENTOR.
Lewis B. Hunter
BY James L. Stewart
his ATTORNEYS.

Nov. 15, 1927.  
L. B. HUNTER  
1,649,307  
METHOD OF MAKING CHOCOLATE PRODUCTS  
Filed July 16, 1923    5 Sheets-Sheet 5

Lewis B. Hunter INVENTOR.
BY James L. Stewart
ATTORNEYS.

Patented Nov. 15, 1927.

1,649,307

UNITED STATES PATENT OFFICE.

LEWIS B. HUNTER, OF YONKERS, NEW YORK, ASSIGNOR TO REMSEN T. WILLIAMS, OF KENSINGTON, NEW YORK.

METHOD OF MAKING CHOCOLATE PRODUCTS.

Application filed July 16, 1923. Serial No. 651,908.

This invention relates to the confectionery art and, particularly, has reference to a method of and apparatus for making various forms from chocolate, compounds thereof, or materials or substances having the same or similar characteristics. The product resulting from the process and from the operation of the various forms of apparatus hereinafter disclosed is also new and a part of my invention.

I have discovered, after considerable study and experimentation, that chocolate and compounds thereof can be shaped, molded and formed by pressure into hollow cylinders and various other forms and shapes while the same is cold or at a temperature below the melting point of the substance. This cannot be done with chocolate while it is warm, owing to the tendency of the substance to quickly liquefy. I have also discovered that, when pressure is applied to a mass of chocolate, or its confectionery compounds, while cold, or below its melting point, particles or separate streams thereof can be caused to cohere together and be compressed into a solid, homogeneous mass, in contradistinction to being formed into such a mass by being first melted or dissolved and then poured into molds and allowed to solidify at a low temperature. And I have discovered that I can, by subjecting chocolate and its various compounds to pressure at a low temperature, produce a novel and useful article of practically any shape desired, the only other requisite being a former, or shaping member, capable of giving to the substance, while under pressure, the shape, form or configuration predetermined or desired.

Heretofore it has been the practice in making chocolate forms to first melt the chocolate and then pour it into suitable molds and allow it to cool. So far as I am aware it has heretofore been regarded as impractical to manipulate chocolate below the melting point for the reason that it will crumble and disintegrate; but I have discovered that where the body or mass of chocolate maintained below the melting point is confined in such a way as to be subject to a high degree of pressure, it may be caused to take any desired form, and that in certain forms of molds hereinafter described it may be wrought or formed into a tube by projecting the mass through a suitable apparatus which divides the column into a plurality of streams and then causes said streams to be united under pressure. One of the discoveries embodied herein lies in the fact that chocolate, maintained at a temperature below the melting point, will adhere, under pressure, and become homogeneous in any form to which it is reduced.

The tube forming device particularly described herein is simply one of many forms that may be employed to utilize the discovery above recited. Many forms of molds having a matrix and a master element may be employed to accomplish the same result where the chocolate is interposed between dies adapted to confine the mass within certain boundaries and subject the same to a high degree of pressure and more or less of constriction.

In the light of the foregoing discovery, it is among the objects of my invention to provide a method of manipulating a mass of chocolate or its compounds, while subjected to or in a temperature below the melting point of the substance, so as to produce predetermined forms, one of such forms being, for example, a hollow cylinder, which may be used as a covering, sheathing, container or holder for various forms and kinds of confections, or the form may be that of a solid cylinder, or a bar of any desired cross-section; to provide a method by which granular, powdered, ground, shaved, or other granulated forms, or a mass of other forms of chocolate and its compounds can be rendered into predetermined form by pressure while at a temperature below the melting point of the substance; to provide a method by which to produce in definite length a hollow cylinder of chocolate by pressure at a temperature below its melting point, which cylinder is capable of use as a holder or container for ice cream or other desired confection; to provide a method by which a hollow cylinder of chocolate can be quickly and economicaly produced and immediately filled with ice cream, or other desired confection, as a part of the process of producing chocolate confections; to provide an apparatus for carrying out the foregoing method by which chocolate forms can be produced quickly, effectively, economically and of any size desired within reason; to provide an apparatus by means of which chocolate cylinders can be made, quickly filled and delivered for wrapping purposes; and to produce a new product or article of manufacture by a method and an apparatus both of which also involve certain novel steps and features incidental to the product required.

In order that my invention may be clearly understood, I have provided drawings wherein:

Figure 1 is a side elevation of an apparatus for making and filling chocolate cylinders, and for carrying out the method hereinabove referred to;

Primarily, it should be understood that chocolate and its confection compounds cannot be readily handled, due to the fact that they quickly melt or liquefy at ordinary climatic temperatures and in places where heat is used for the purpose of making confections, it being a fact that the temperature of the body or the hands will very quickly melt and dissolve the chocolate and render it difficult, if not impossible, to handle commercially. Therefore, the first essential is that the apparatus used for the purpose of economically producing my product must have, or be able to produce, a low temperature, or temperature below the melting point of the substance being treated, this being brought about by providing cooling or ice jackets, where necessary, in order to prevent the chocolate and its confection compounds from melting or tending to melt or dissolve. The provision of means for this purpose will be succinctly referred to hereinafter and in the claims as subjecting the substance operated upon, for example, to a low temperature, or in some similar comprehensive manner. The next essential is to produce the material, such as chocolate, its commercial compounds, or its confection compounds, in a granular or mobile mass capable of being poured and packed into a cylinder, and, to this end, I reduce the chocolate or its compounds to the condition and form desired by grinding, shaving or otherwise granulating the chocolate, so that it may be poured into a container and therein confined during certain of the succeeding steps. The substance may also be melted to a limpid state enabling it to be poured into the container. Thus handled or packed or loaded into a container, the substance to be treated is subjected and maintained at a low temperature as heretofore mentioned. In the condition just set forth the mass of the substance is subjected to pressure which may be applied in any suitable and convenient manner. While under pressure, the substance, in making hollow cylinders, is subjected to the action of a separator and of a mold, the separator having the function of dividing the mass in the container into a plurality of thin or small columns, bars or streams, and the mold having the function of bringing said thin or small columns, bars or streams together, compressing the same, and causing the particles thereof to coalesce and unite into a rigid, homogeneous mass or form, the form varying correspondingly with the mold, or forming member, employed. The size of the cylinders or other forms can be any within reason which may be desired for the particular purpose in hand. In the instance of hollow cylinders, they are cut into predetermined lengths suitable as a container or holder for ice cream or other similar confectionery substance. As a preliminary to dividing the cylinders into a predetermined length, and according to a successive but incidental step of my method, the ice cream or other confection is forced into the chocolate cylinder or container. Then, the cylinder and its contents are cut into the predetermined length. As a subsequent step, the filled cylinder is ejected or shifted or transferred to a receptacle or holder from which it can be readily taken and wrapped.

Instead of producing hollow cylinders, which may or may not be utilized as suggested, I may make, according to my method, a solid cylinder, pressure being applied in the manner described, but the forming member differing by the omission of the means by which the mass is divided into streams. Also, by my method of treatment of the substance, bars of any cross-sectional form may be produced, and various ornate and useful forms and figures can be produced.

It will be understood that my method is not dependent upon any particular form of apparatus, and that the structure of such apparatus may be varied and its features modified and changed to accord with the requirements of the particular product desired and made according to my method. In the drawings I have shown various forms of apparatus which can be utilized in practicing the fundamentals of my method. These apparatus vary according to the form of the product desired; but, each embodies features essential to the performance of my method based upon the fundamental discovery of the characteristics of the substance treated.

One form of apparatus for carrying out my method and producing my product is shown in Figures 1 to 4, and therein the numeral 1 indicates a base affording a platform or support for the entire structure, the base having erected thereon a frame 2 which may be bolted to the base, as at 3, the frame being in the form of a yoke adapted to receive between its two branches 4 a receptacle 5 having an opening at the top covered by a lid 6, through which opening the receptacle 5 may be filled with cracked ice. Passing through both the branches 4 of the frame and also through the receptacle 5 is a cylindrical container or holder 7 adapted to receive the granular chocolate or substance, the said cylinder being held in place by the screw-cap and bearing 8 and the mold 9, the cap and mold being screwed upon opposite ends of the cylinder 7 until they abut against the outside of the opposite branches 4 of the frame 2. A piston 10 operates within the cylinder 7 and its rod 11 is screw-threaded and extends through the nipple 12 operating in the bearing of the cap 8, said nipple having a reduced, screw-threaded end upon which the handle 13 is mounted. A gasket or washer $x$ aids in sealing the outer end of the cylinder. At the inner end of the cylinder 7 and within the mold 9, a separator 14 is held between the end of the cylinder and a shoulder of the mold, said separator being in the form of a ring provided with a plurality of arms 15 which support centrally within the ring and centrally of the cylinder, as well as of the mold, a solid cylindrical core 16. This core, at its inner end within the cylinder, is given the form of a cone, as at 17, or it may be given a form corresponding to the passages through the ring 14 between the arms 15. The outer end of the core 16 is terminated abruptly at the outer end or nozzle of the mold 9. As will be seen in Figures 2 and 4, the mold consists of the cylindrical portion 18 corresponding with the inner surfaces of the walls of the passages between the arms 15 of the separating ring 14, said cylindrical portion merging into the conical portion 19, the lesser diameter of which merges into the cylindrical passage 20 of lesser diameter than the cylindrical portion 18 terminating at the inner end of the mold, said cylindrical passage 20, as well as the conical portion 19 of the mold surrounding the core 16. Thus by the cooperative action of the conical former 19 and the core 16 the chocolate under pressure is forced into the form of a tubular cylinder and passes out of the mold through the passage 20 surrounding said core. The apparatus so far described is capable of carrying out my method, viz, subjecting a mass of chocolate or similar substance to pressure in the presence of a low temperature and shaping the mass into a predetermined form, the latter being, in this instance, a hollow cylinder. And it will be seen that this product is new, in that it has attributes and characteristics not heretofore imparted to such articles by any method or mode of treatment known to me. The new product is a chocolate cylinder, form, or article wrought from a mass of cold chocolate, or similar substance, by pressure and constriction, the mass being held in a close vessel while the pressure is being applied.

Figure 3:
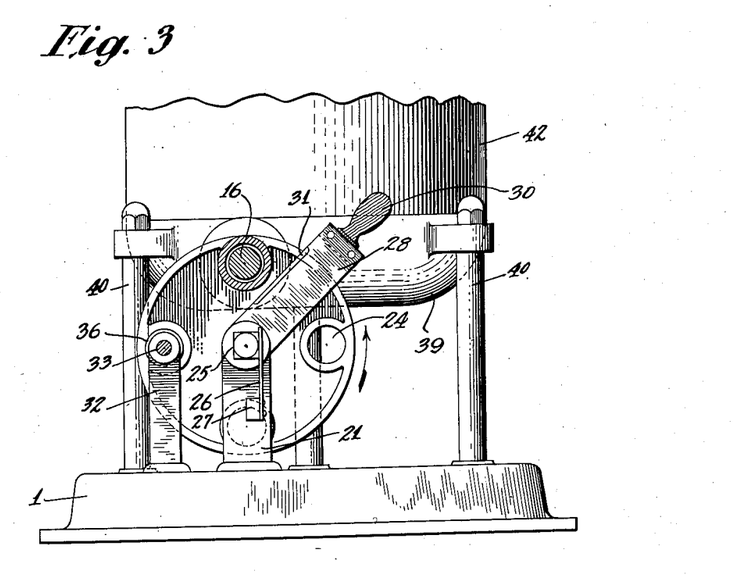
Figure 3 is a transverse section taken on the line 3—3 of Figure 2.
Figure 4:
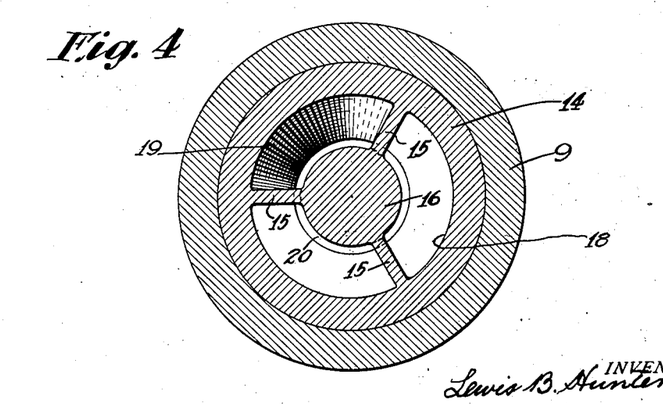
Figure 4 is a transverse section taken on the line 4—4 of Figure 2.

To provide a mechanism for receiving the cylinder and holding it while it is being filled with ice cream or other desired substance, and cutting the product into a desired length and ejecting it from the apparatus as a preliminary to wrapping, I have erected a pair of uprights 21 upon the base 1 adjacent the delivery end of the mold 9, said uprights affording bearings for a shaft 22 fixed to the hub 23 of a rotary drum formed into a plurality of cylindrical carriers 24, said carriers being arranged 90° apart around the circumference of the drum and having a diameter substantially the same as that of the delivery end 20 of the mold 9. The drum may be rotated in any suitable manner; but, in order to hold it with any one of its carriers 24 in registry with the passage 20 at the delivery end of the mold, I have squared the end 25 of the journal extending at one side beyond an upright 21, upon which bears a flat spring 26 fixed to a lug 27 on one side of the upright. The drum can thus be rotated by hand until the spring snaps against a flat side of the journal, whereupon the operator will know that one of the carriers is in registry with the delivery end of the mold. So that the cylinder or product may be of the required length, a knife is mounted on the drum adapted to swing circumferentially thereof and cut the product. The knife consists of the two blades 28, the inner ends of which are mounted to turn on the journal 22, and the outer ends of which are connected by the block 29, to which the blades are rigidly secured and which block is provided with a manipulating handle 30 by medium of which the blades may be oscillated around the circumference of the drum. One edge of the blades, as at 31, Figure 3, is sharpened to facilitate cutting the chocolate cylinder and its contents, if any. By this means, the chocolate cylinder produced as described in the foregoing and also filled as suggested, can be cut into definite length, and each definite length quickly shifted to a position where it may be ejected from the carrier, the attainment of such position also bringing another carrier in registry with the functional end of the mold so that another chocolate cylinder may be produced according to my method.

Figure 1:
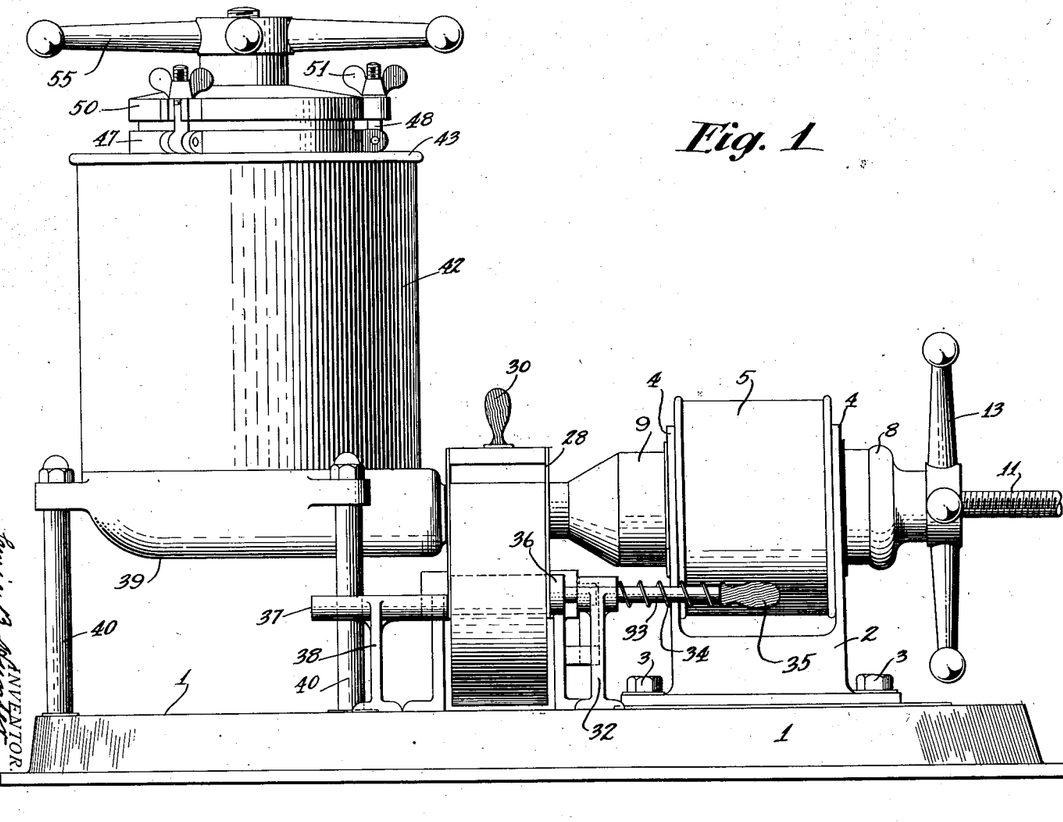

I have provided for ejecting the cylinder from the carriers as shown in Figures 1 and 3, wherein an upright 32 is erected on the base 1 through which operates a rod 33 surrounded by a spiral spring 34, one end of which rests against the upright 32 and the other end of which rests against the handle 35. The rod, at its end opposite the handle, has a head or piston 36 of a diameter enabling it to enter any one of the carriers 24, and thus press upon and eject, when given longitudinal movement, the cylinder at rest within the carrier, whether filled or unfilled. As the cylinder is ejected from the carrier, it slides onto a semi-circular support or rest 37 mounted at the upper end of an upright 38 secured to the base 1 beside the drum, the diameter of the support 37 being substantially that of the carriers 24. Having thus been ejected from the drum the cylinder, whether filled or unfilled, can be immediately wrapped or conveyed to a place of storage.

Figure 2:
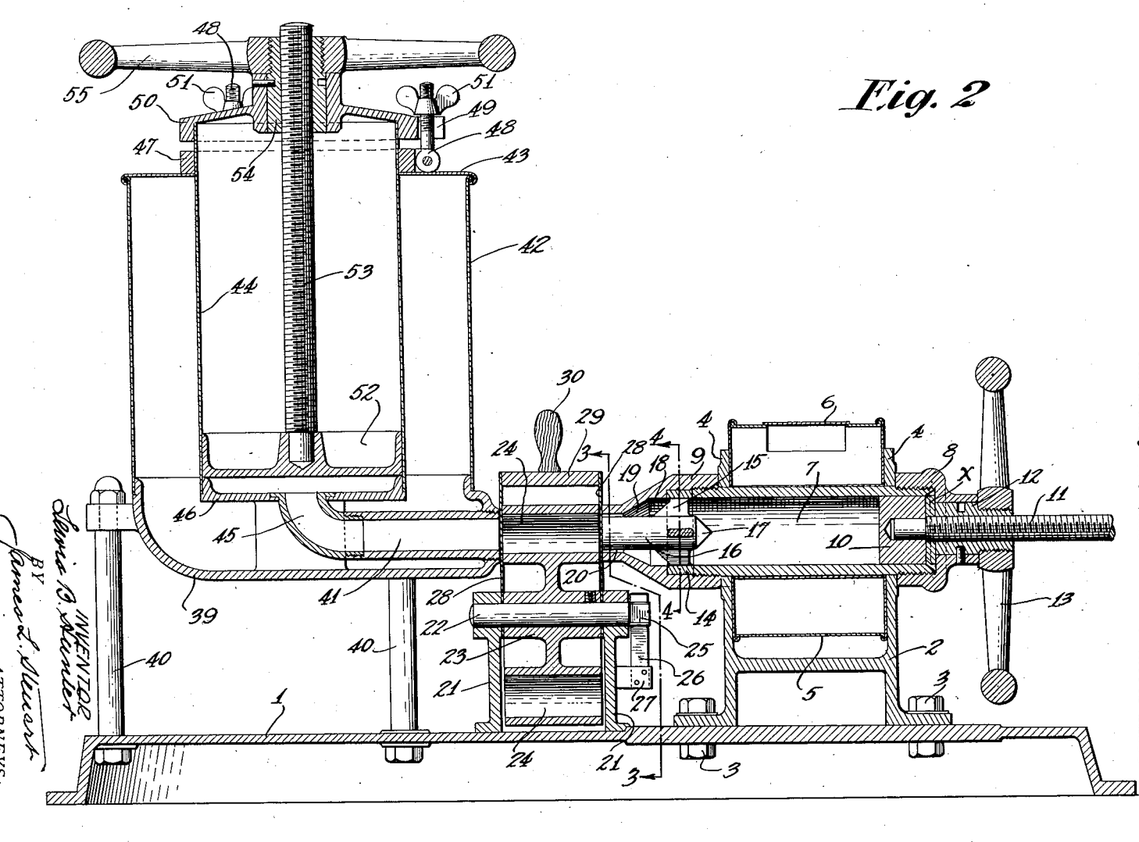
Figure 2 is a vertical, central, longitudinal section of the apparatus shown in Figure 1.

In order that the cylinder produced by my method may be filled with ice cream, or any other desired confection, I have provided means for holding and ejecting the cream, or other substance, into a chocolate cylinder, such means being shown in details in Figures 1 and 2, wherein an ice or freezing receptacle has its bottom 39 supported upon uprights 40 mounted upon the base 1 in any suitable manner. The bottom 39 has formed therewith a cylindrical member 41 the diameter of which is slightly less at its delivery end than the diameter of the carriers 24 in the drum, and the delivery end of which member 41 terminates adjacent the carrier drum, there being just room enough between the adjacent ends of the drum and the member 41, as well as between the delivery end of the mold and the adjacent end of the drum to permit the knife blades 28 to pass between them. Mounted upon the bottom 39 is the cylindrical body portion 42 of the ice receptacle, the latter having a removable cover 43. The center of the cover 43 has an aperture sufficiently large to permit the freezer or container 44 to pass thereinto and be coupled at its bottom, as by the curved coupling 45 with the cylindrical member 41, the bottom 46 of the container having an aperture therein registering with the coupling 45, and the member 41, so that the contents of the container can be forced into the several carriers 24 of the drum. The container 44 may have a flange or ring 47 shrunk thereon to establish the limit of entry of the container into the ice tank and also to afford a pivotal support for a plurality of fastening bolts 48, which pass through open end slots 49 of the cover 50, winged nuts 51 being adapted to secure the cover tightly upon the container. The container 44 has a piston 52 capable of being manipulated by a screw rod 53 passing through the nipple 54 in the cover 50, which nipple is provided with a manipulating handle 55 of any suitable form adapted to cooperate with the rod 53, to raise and lower the piston 52, downward movement of which latter will force the contents of the container 44 through the coupling 45 and cylindrical member 41 for delivery in a solid mass into the chocolate cylinder held in a carrier 24 of the drum. Thus a chocolate cylinder made in accordance with my method may be filled with the contents of the container 44 and the product cut to the desired length and delivered upon the support 37 for further treatment.

While I have thus far described an apparatus for making and filling a hollow chocolate cylinder, my invention is not limited to the production of such an article. I may omit the filling and produce merely the hollow cylinder; or, I may produce a solid cylinder by substituting a mold or forming member which does not contain the core and separator. Such solid cylinder may be cut into definite lengths in the carrier-drum and ejected therefrom for wrapping, as previously described.

Figures 5, 6, 7:
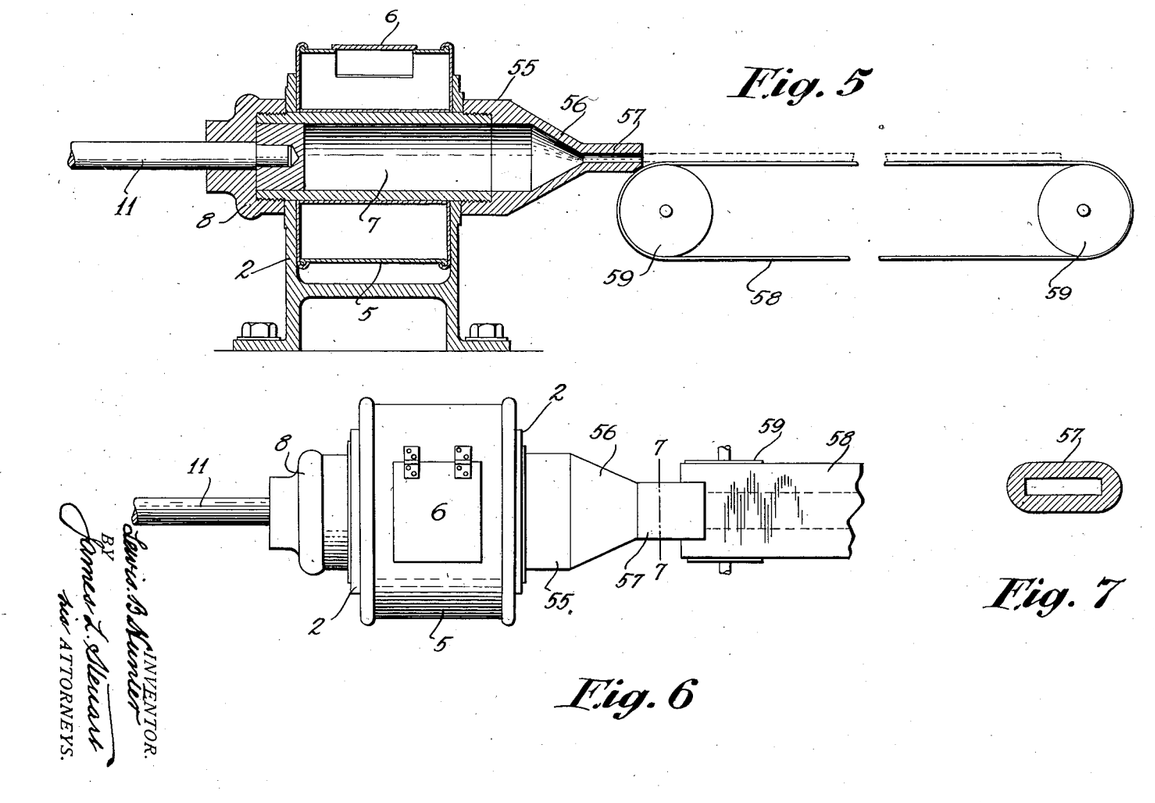
Figure 5 is a view similar to Figure 2, showing another form of apparatus wherein, by my method, a different article can be produced.
Figure 6 is a top plan view of the shaping member shown in Figure 5.
Figure 7 is a section on the line 7—7 of Figure 6.

I may also practice my method in connection with apparatus adapted to produce chocolate artcles, such as flat bars, or bars having various forms in cross-section. As an example of such an apparatus, reference is made to Figures 5 to 7, wherein the frame 2, receptacle 5, holder 7, screw-cap and bearing 8 and rod 11 are all substantially the same as in Figures 1 and 2. In this form of my apparatus, however, the mold 55, applied to the end of the holder 7, is at its inner end cylindrical, and from thence is tapered, as at 56, and terminates in a flat tube 57, which gives to the substance being treated a rectangular form. This terminal of the mold or shaping member may have any other cross-section desired dependent entirely upon the shape and form of the article to be produced. This form of my apparatus produces a continuous strip or long bar which is deposited from the nozzle 57 upon a carrier indicated at 58, which, in this instance of my invention, is an endless belt guided about pulleys 59, to one of which power may be applied for the purpose of actuating the belt. The conveyer 58 carries the product along for delivery to any suitable support or manipulating apparatus by means of which it may be cut into lengths and wrapped or otherwise treated. The product emanating from the nozzle 57 is a wrought, condensed strip, bar or ribbon of chocolate or other substance possessing all the characteristics of the article produced by my method and the apparatus illustrated in Figures 1 to 4, inclusive.

Figure 8:
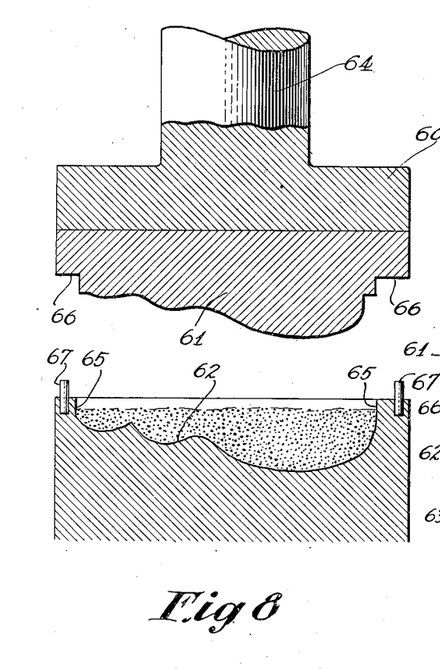
Figure 8 is a sectional elevation of a pair of dies constituting another form of my invention, the dies being separated.
Figure 9:
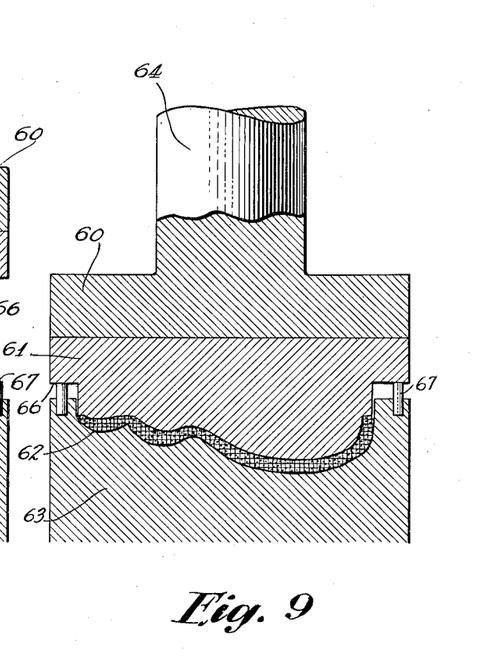
Figure 9 is a view similar to Figure 8, the dies being shown together, so that their executive faces cooperate upon the substance treated.
Figure 10:
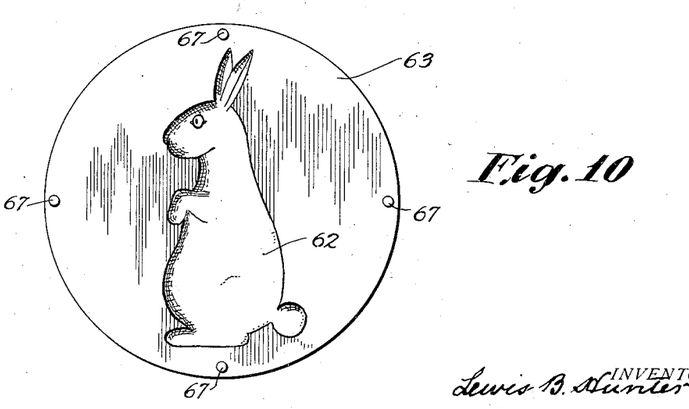
Figure 10 is a top plan view of the female die and container.

I may also practice my method in connection with an apparatus adapted to produce ornate or useful chocolate articles, such as imitations of animals or other figures. This idea of means is shown in Figures 8, 9 and 10, wherein a block 60 carries either a male or female die at its executive end, indicated by 61, which may have a conformation simulating animals or bunches of fruit or human figures or other desired surface ornamentation, the complemental die 62 being carried by a block 63, which block may be rigidly held while the block 60 may be movably mounted to be actuated by a rod or bar 64. The two blocks carrying the complemental dies may be either circular, angular, oval or any other form in outline, and one of the dies 62 may be made sufficiently deep to provide a flange or wall 65, by which the substance to be treated is confined when under pressure. The movable member or block, as, for example, 60, is moved into the container or die 62 so as to impose pressure upon the substance held therein, thus forcing it into the desired form. The die 60 may have a stop flange or surface 66 around its periphery projecting any desired distance beyond the executive face thereof, said flange cooperating with stop pins 67 carried by the block 63 and surrounding the executive face 62 of the die. Thus the two executive faces 61 and 62 cannot be forced together; but, are limited in movement the one toward the other, so that the material compressed between the two executive faces will have a predetermined thickness, the opposite surfaces of which will conform accurately to the said executive faces 61 and 62. By this means practically any desired form of product can be obtained capable of being subsequently mounted upon a suitable base for the purpose of filling with candy or other confection, or to be used in any other suitable manner, as by joining two similar parts to produce opposite similar surface conformations.

It will thus be seen that my method is equally carried out with reference to this form of apparatus, and that the product of method and apparatus has all the characteristics of those described with reference to the other figures of the drawings. That is to say, the substance, regardless of its form, is placed in the die container 62 and is compressed while cold or below the melting point of the substance, and at the same time, owing to the conformation of the cooperating surfaces of the dies 61 and 62, the substance is simultaneously constricted more or less over the surfaces of the dies in producing the product. The female die 62 may also have a cooling or ice jacket surrounding it, as set forth with reference to the other forms of my invention. The block 63 carrying the die 62 and the ice chamber may be secured to or suitably mounted upon a support, the form being immaterial so far as my invention is concerned.

In the forms of apparatus shown in Figures 1 to 7, the forming members, at the delivery end of the container 7 for the substance to be treated, have a constricted portion terminating in a nozzle of indefinite length, but of uniform dimensions from end-to-end. This nozzle, after the substance has been constricted and the several streams, bars or strips have been compressed and solidified, performs the function of holding the form given and molding and smoothing such form for a short period before delivery, depending upon the length of the nozzle. Thus, when the shaped product issues from the nozzle and is received by the carrier or conveyed, it has no other tendency than to hold the form and shape given thereto by the forming member.

From the foregoing it will be seen that my invention, relating to the discovery of certain characteristics of chocolate, chocolate compounds, and substances similar thereto and having similar characteristics, may be carried out in connection with various forms of apparatus and machinery and that my invention, relating to a method, or process, or "art", does not depend, fundamentally, upon particular apparatus. On the contrary, my method may be performed, or carried out by hand, in connection with simple tools, since the essentials are to maintain the substance at a low temperature, or below its melting point, and to so confine the substance that pressure can be properly applied thereto, and to so act upon the substance, while under pressure, that a predetermined form may be given thereto. However, the apparatus employed by me is new, in several particulars, and this is also true as to the general combinations of elements employed in producing certain forms of the article or product resulting from the practice of my method or process. Such combinations and particulars of elements will be duly claimed by me.

I am aware that structures, fundamentally similar to that disclosed herein, have been heretofore employed in treating lead and some of its alloys when just set, or short of fluidity. The treatment required heat and great pressure, and a closed vessel with a delivery end of peculiar and particular conformation and structure. This treatment, in the production of lead-pipe, was practically a welding process. I am also aware that a paste has been formed of flour and shaped and dried and used for food; and that various plastic substances have been similarly treated for the production of specific articles.

My invention is clearly distinguishable from the foregoing processes, and all others known to me regardless of the purpose thereof. Essentially my invention resides in the discovery of the characteristics peculiar to the chocolate, its compounds, and analogous substances, which enable such substances to be treated while cold, or in or at a temperature below the melting point of the substance. My process is applicable to the substance regardless of its initial form or condition; that is to say, whether chipped, shaved, granulated, powdered, or in a solid mass produced by melting and molding until it becomes cold. The functional results of my process emanate from my discovery that the substance has characteristics enabling its particles, when brought together, while cold, in streams, strips or bars, under pressure and conditions disclosed herein, to coalesce and unite in a homogeneous mass or body and take any predetermined form. The important characteristics of the product, resulting from my process, emanate directly from pressure and constriction while the mass is cold and held in a closed vessel. The product is practically wrought from the cold mass and can be produced rapidly, economically and in any length desired within reason.

It will be obvious that the chocolate product resulting from my process has considerably greater density, and, therefore, higher specific gravity than ordinary chocolate products, as well as a somewhat finer texture, and, in these respects, as well as in others, constitutes a distinctly novel article.

Having thus described my invention, what I claim and desire to secure by Letters Patent is:

1. The method of manipulating comminuted chocolate which consists in molding it into the desired form by pressure while the chocolate is maintained below the temperature at which it liquefies.

2. The method of manipulating comminuted chocolate which consists in molding it into the desired form by pressure and maintaining it during the pressing operation in substantially a solid form by refrigeration.

3. The method of manipulating chocolate or its compounds which consists in confining the chocolate in a container associated with a die, and subjecting the same to a high degree of pressure adapted to force the chocolate in the direction of said die, and at the same time maintaining the chocolate at a degree of temperature below the melting point of the chocolate.

4. The method of manipulating chocolate or its compounds to reduce the same to predetermined forms, which consists in confining the chocolate in a container associated with a suitable die, then exerting on the chocolate a degree of pressure sufficient to cause the same to take the form of the die, while the chocolate is maintained at a temperature sufficiently low to prevent its becoming plastic and during such operation maintaining the chocolate at a temperature below the point where it will become plastic.

5. The process of molding chocolate, or chocolate and its compounds, which comprises cooling a mass of chocolate or chocolate and its compounds to a point substantially below its melting point, and then exerting sufficient pressure upon said mass of chocolate or its compounds to force it through a die opening of the desired shape, while maintaining the chocolate or its compounds cold and in its solid state.

Signed by me at New York city this 11th day of July, 1923.

LEWIS B. HUNTER.